United States Patent

[11] 3,633,641

[72] Inventor Giordano Tomelleri
 Via Montorio 22, Verona, Italy
[21] Appl. No. 41,525
[22] Filed May 28, 1970
[45] Patented Jan. 11, 1972
[32] Priority May 29, 1969
[33] Italy
[31] 61244-A/69

[54] APPARATUS FOR CUTTING FRUIT AND REMOVING STONES THEREFROM
5 Claims, 5 Drawing Figs.

[52] U.S. Cl..................................................... 146/28 R
[51] Int. Cl....................................................... A23n 3/08
[50] Field of Search........................................... 146/18, 28

[56] References Cited
UNITED STATES PATENTS
3,465,799  9/1969  Tomelleri..................... 146/28

Primary Examiner—Willie G. Abercrombie
Attorney—Oberlin, Maky, Donnelly & Renner ABSTRACT: Apparatus for cutting fruit and removing stones therefrom comprising an indexable member having a cavity in which the fruit is supported, a pair of cutter blades located above and below said indexable member arranged to be moved towards each other in order to cut the flesh part of the fruit, a forked knife located between the blades of each pair of cutter blades, said knives each having a pair of curved prongs of different lengths and means for rotating the knives around the stone to remove the stone from the flesh part of the fruit whilst the fruit is held in the cavity by the pairs of cutter blades.

PATENTED JAN 11 1972 3,633,641
SHEET 1 OF 2
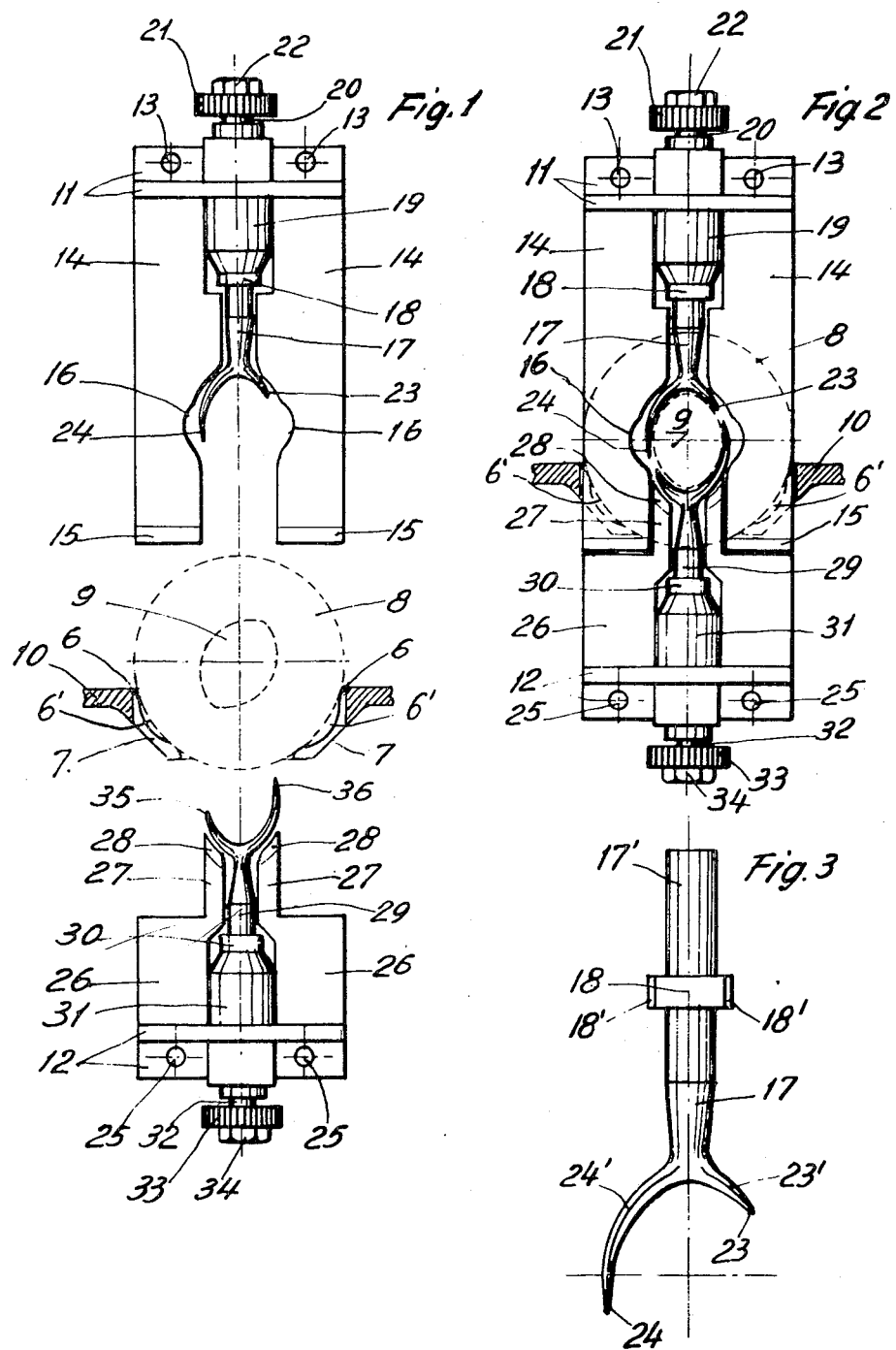

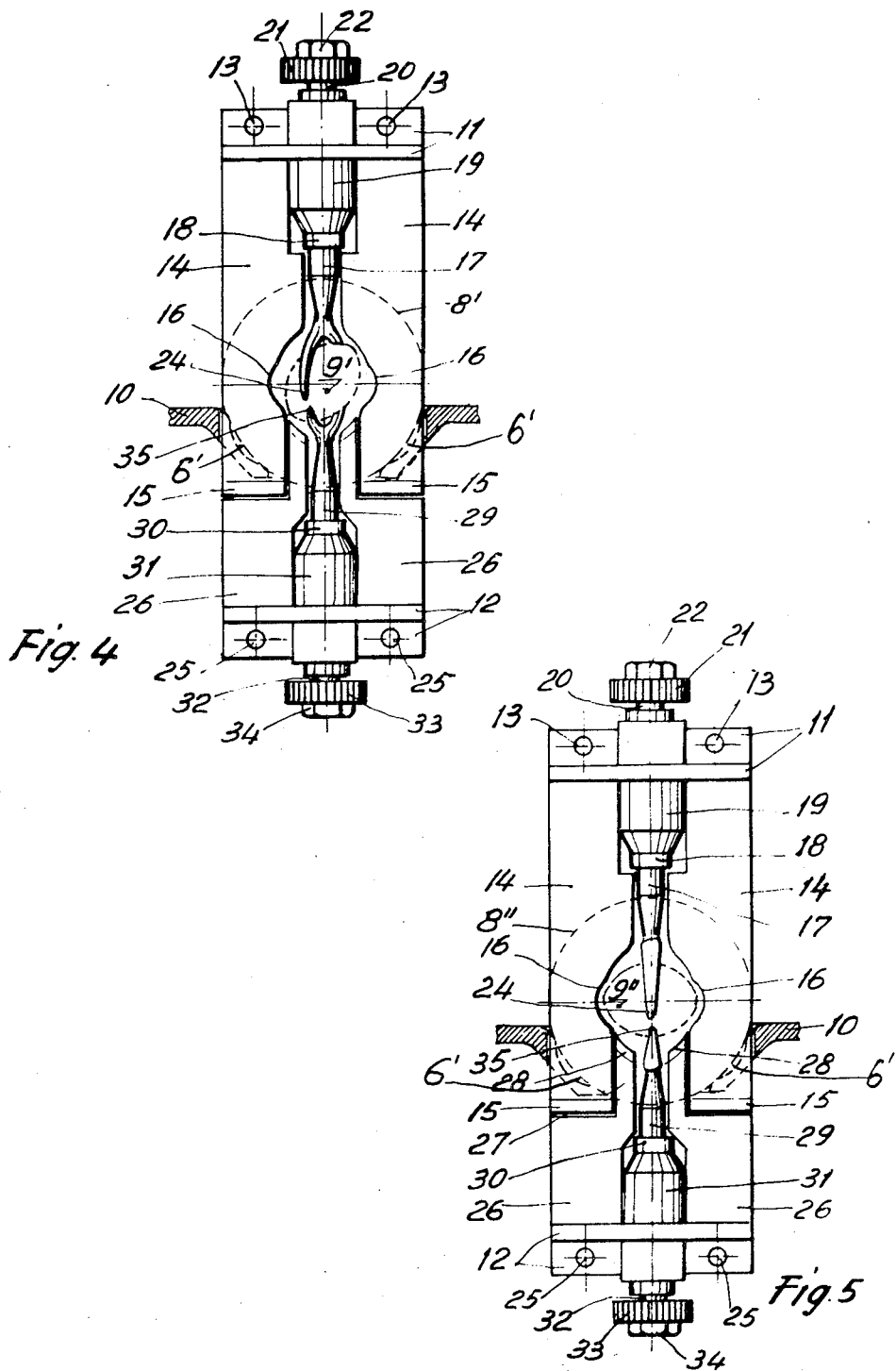

APPARATUS FOR CUTTING FRUIT AND REMOVING STONES THEREFROM

This invention relates to an improvement in apparatus used in the canning industry which is provided with means for cutting and destoning peaches, or similar fruits.

In preparing half-cut peaches it is necessary to cut the peach and remove the stone from it. Up to this time, peaches have been cut by means of pairs of blades penetrating the skin portion of the fruit and passing through the flesh of it, but this method did not produce smooth cut surfaces, because the cutting of the flesh below the stone was accomplished by the destoning knife penetrating in the flesh of the fruit with a motion in the opposite direction to that of the motion of the cutter blades, entering between the blades themselves. Consequently, due to the thickness of the tips of the destoning knife respect to the thickness of the blades and due to the impossibility of preventing the destoning knife sticking to the blades, the cut surface in this particular part of the fruit was not smooth at all.

Besides that, up to the present time the destoning of peaches has been carried out by means of pairs of knives of substantially semicircular shape and with opposed tips, which cut the flesh up to the stone.

Consequently, it was necessary to physically divide the two halves of the peach, and the stone invariably sticks to one-half of the peach from which it has to be removed manually. Consequently, the manual removing of the stone from the half peach involves a loss of time during the processing, the use of personnel and an increase in the production costs.

Besides that, the half peaches do not have a nice appearance and their commercial value decreases because the halving and destoning surfaces are not smooth. Therefore, an object of the present invention is to provide an apparatus in which fruits such as peaches and similar fruits, carried between two pairs of halving blades and a pair of destoning knives, are completely halved and destoned, so that further manual labor is not required, and in such a way that very smooth halving and destoning surfaces are obtained.

Another object of the present invention is to provide apparatus for the halving and destoning of fruits having stones of different longitudinal sizes, without having to replace the destoning knives with knives of a different size.

Other advantages and objects of the present invention will become apparent from the following description of the apparatus and the mode of operation.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 illustrates a side elevation of the apparatus showing the cutter blades and destoning knives in the inoperative position;

FIG. 2 is a view similar to that of FIG. 1 showing the cutter blades and destoning knives at the end of their cutting operation;

FIG. 3 is a side elevation of one of the destoning knives;

FIG. 4 is a view similar to that of FIG. 2 but showing a fruit not properly orientated; and FIG. 5 is a view similar to that of FIG. 4 showing a fruit in which the stone is orientated with its longitudinal axis 90° to the vertical axis of the cutter blades and destoning knives.

A conveyor belt 10 is provided with cavity 6 having an annular groove 6' for reducing to a minimum the friction contact between the wall of the cavity and the fruit and the cavity 6 is provided with an open bottom and lateral windows 7 to permit the passage of the cutting blades and the destoning knives. A fruit 8, a peach for example, which has in its interior a stone 9, is located in the cavity 6. When the fruit 8 is correctly orientated within the cavity 6, the major axis of the stone 9 is coincident with the vertical median axis of the destoning device.

The cavity 6 of the conveyor belt 10 advances intermittently and when it is in the rest position, it is located between plates 11 and 12.

During the rest position of the cavity, the plates 11 and 12 are moved one towards the other so that the halving and destoning elements penetrate through the flesh part of the fruit 8 from opposite sides.

Carried by the plate 11 by means of fixing elements 13 are two-cutter blades 14 with cutting wires 15. Between the blades 14 there is located a rod 17 which has at one end a forked knife having two curved prongs of different length, the shortest prong is indicated at 23 and the longest prong indicated at 24. The other end of the rod 17 is received in a housing 19 and is connected with a shaft 20 of a gearwheel 21 connected to it by means of a nut 22.

The rod 17, as shown in FIG. 3, is separated from its higher end 17' by means of a tally withdrawal flange 18 rounded off on its ends 18', and on its lower end the prongs 23 and 24 have cutting edges 23', 24' which can be formed on one or on both faces of the prongs. The gearwheel 21 engages a rack, not illustrated, which is actuated by a motor, which rotates the gearwheel 21 to rotate the rod 17 and consequently the prongs 23 and 24 so that the flesh of the fruit 8 is separated from the stone 9.

The lower plate 12 carries, by means of fixing elements 25, a pair of blades 26 having halving projections 27 provided with cutting wires 28 which are able to be inserted, during the operative stage, see FIG. 2, between the blades 14 of the plate 11, so that the halving of the fruit 8 can be completed without leaving any space between the halving elements 14 and 27. Between the projections 27 there is located a rod 29 provided at one end with a forked knife constituted by curved prongs 35 and 36 which lie opposite the prongs 23 and 24 of the rod 17. The rod 29 is connected at its other end with a shaft 32 of a gearwheel 33 which is secured to it by means of a nut 34.

The rod 29 is provided with a clamp 30 and is housed in a housing 31 which is connected to the plate 12. The rod 29 is caused to rotate in a similar manner to that described in connection with the rod 17.

With a particular reference to FIG. 2, it will be noted that the separation of the flesh part of the fruit 8 from the stone 9 is perfect even if the tips of the prongs 23, 24 are separated from the prongs 35, 36 because the rods 17, 29 accomplish more than one complete revolution around their axis.

For destoning the fruits 8 which have larger stones 9 than the one illustrated in FIG. 2, it is enough to keep the forked knives separated, but it is essential that each of the longest prongs 24, 36 extends around at least half of the stone.

When the plates 11 and 12 are moved towards the other, the pair of blades 14 passes through the flesh part of the fruit 8 and projects through the cavity 6 (see FIG. 2). The action of cutting the flesh part of the fruit 8 beneath the stone 9 is carried out by the prongs 35 and 36, and the halving cutters 27, interposing themselves exactly between the blades 14, (see FIG. 2), complete the halving of the flesh of the fruit also for those parts which were not cut by the prongs 35, 36 or by the blades 14.

In case a stone 9, (as the one on FIG. 1), is not perfectly orientated, when the fruit 8 is placed in the cavity 6, the pair of blades 14, when they penetrate the flesh part of the fruit 8, hit the stone 9 and compel it to place itself in such a way that will permit the pair of blades 14 to continue to move towards the bottom. This happens because of the rotation of the stone 9 inside the fruit 8, or because of the rotation of the entire fruit 8 if the flesh part of it is particularly solid.

In some cases, the stone 9 gets a position of perfect orientation, as it is shown in FIG. 2, in other cases it can assume different positions, as it is shown for the fruits 8' and 8'' of FIG. 4 and 5, in which the stones 9' and 9'' did not reach the ideal orientations, even when the blades 14 have passed through the fruit 8.

It will be noted from FIGS. 4 and 5 that the stones 9' and 9'' are compelled by the blades 14 to take up such a position that the destoning prongs 23-24 and 35-36 can encompass them. But it is evident that in such cases there is no cut of flesh around the stone 9', 9'', but a real unfleshing of the stone. In fact, the stone 9', 9'' encompassed by the prongs 23, 24 and 35, 36 is made to rotate by them about the rotating axis of the rods 17 and 29 and there is no way it can hit the blades 14 because the blades 14 are provided with recesses 16 whose diametral length is greater than the highest diametral length of the stone 9', 9'' of the fruit 8. It is evident, even though not illustrated in the drawings, that the fruits 8 can be held in place in the cavity 6 by means of elastic cowls provided with windows for the passage of the halving and destoning blades. It is obvious that eventual formal variations concerning the invention at the moment of the practical realization have to be considered part of the invention which is defined by the following:

I claim:

1. Apparatus for cutting a stone containing fruit and removing the stone therefrom comprising an indexable support member having a cavity therein for supporting the fruit, means for intermittently moving said support member, a first pair of cutter blades located above said support member, a second pair of cutter blades located below said support member, means for moving said first pair and said second pair of cutter blades towards each other and through said cavity to cut the flesh part of the fruit, a first forked knife located between said first pair of cutter blades and a second forked knife located between said second pair of cutter blades, said first and second forked knives each being provided with curved prongs, the prongs of each pair of prongs being of different length, and means for rotating said forked knives to remove the stone from the flesh part of the fruit while the fruit is held in said cavity by said cutter blades.

2. Apparatus as set forth in claim 1 in which the second pair of cutter blades are arranged to pass between the blades of said first pair of cutter blades when moved towards each other.

3. Apparatus as set forth in claim 1 in which the short prong of one forked knife is located opposite the longer of the prongs of the other forked knife.

4. Apparatus as set forth in claim 1 in which said first and second forked knives are rotated one complete revolution about their axis after penetrating the flesh part of the fruit.

5. Apparatus as set forth in claim 1 in which each forked knife is rotated through a gear and rack.

* * * * *